July 6, 1954  D. B. MILLER  2,682,720
VALVE TAG
Filed Aug. 8, 1951
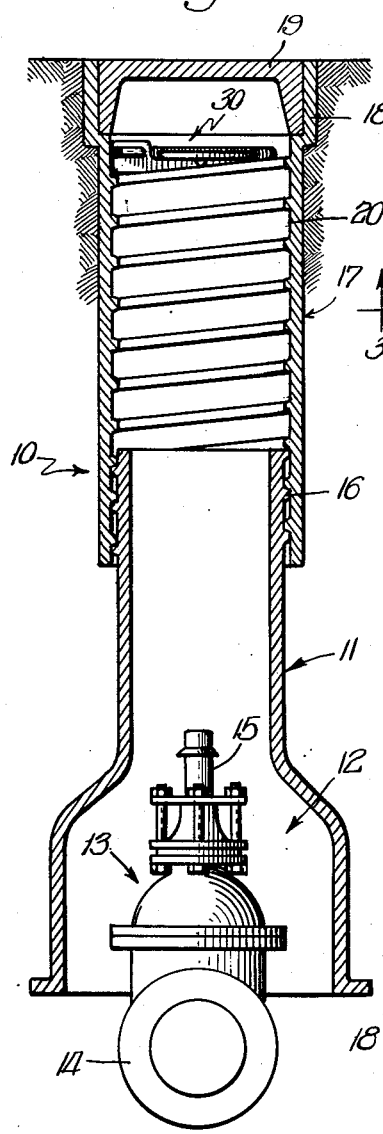
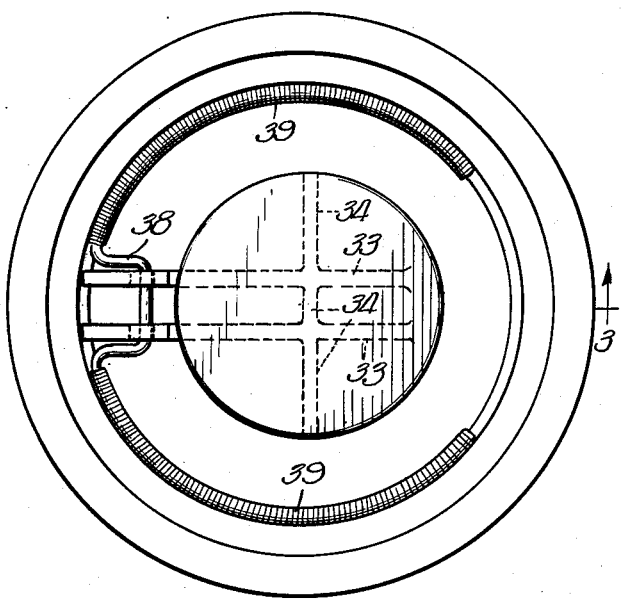
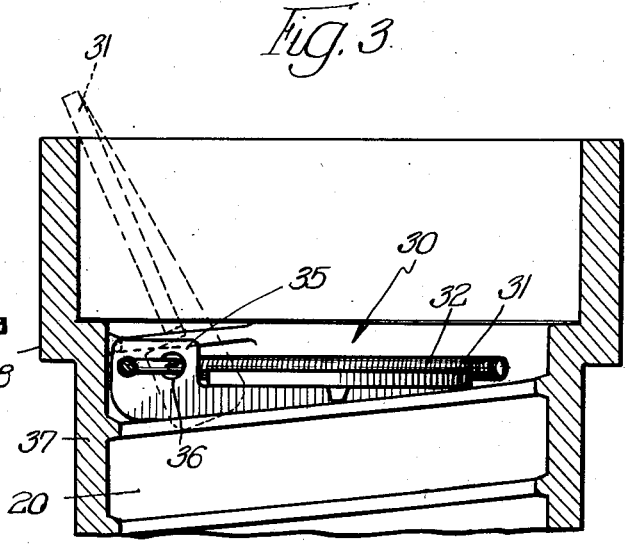
INVENTOR.
Donald B. Miller

Patented July 6, 1954

2,682,720

UNITED STATES PATENT OFFICE 2,682,720

VALVE TAG

Donald B. Miller, Wheaton, Ill.

Application August 8, 1951, Serial No. 240,885

1 Claim. (Cl. 40—2)

My invention is directed to a new and improved valve tag and more particularly to a valve tag for disposition at the upper end of an underground valve box, of a type generally termed a "Buffalo" box, for preventing the insertion of a valve operating T-wrench in the Buffalo box in operating a valve housed at its lower end without first presenting a description of the valve to the operator, as indicated on the valve tag, thereby assuring a positive identification and safe operation of the valve.

It is a common practice for utility companies in distributing their commodities, such as household gas, water or the like, to carry such throughout a community to be supplied via large underground pipes or mains. Generally speaking, central mains carry the gas or water to the area to be supplied and a group of individual households or consumers are connected to the central mains via secondary mains which are provided with suitable shut-off valves for the selective isolation of the secondary mains from the central mains. For various reasons such as corrosion, rusting, water damage or related causes, it is oftentimes necessary to repair these secondary mains and for that purpose the control valves isolating such from the central mains are closed. It is the general practice to caution consumers being supplied from such a secondary main sought to be repaired, prior to the cutting off of the supply therefrom so that they will be aware of the lack of supply during the repair period. Now, it many times occurs that these secondary main control valves are closely grouped together, such as at the intersection of a highway under which they are run, so that the identification and operation of the proper control valve becomes confusing to the operating personnel. It is obvious that if a gas main, for instance, were erroneously shut off from the central supply main, the pilot lights associated with gas appliances supplied thereby would be extinguished. If that main were then opened up again without the consumers being forewarned or aware of such an occurrence, serious gas leakage might ensue. It is paramount then, that the operation of the shut-off valves be accurate and carefully contemplated. To guard against erroneous operation of these valves, identifying tags normally are mounted at the upper ends of the Buffalo boxes housing such valves to inform the operator of the valve characteristics, identification and other necessary operating information. Such valve tags, in the past, usually have been connected to bracket means, threadingly inserted or mounted through a side wall of the Buffalo box. Of course, the box being underground, such is subject to serious damage by moisture and over a period of time these connecting brackets corrode and deteriorate, preventing their easy removal for replacement. All too often the connection of the tags with the Buffalo box rust out, permitting the tags to fall unaccessibly into the bottom of the Buffalo box. Obviously, with the tag information for the valve lost, the operator is at a loss to properly identify and operate the valve. As a result, erroneous and dangerous operation of the valve becomes possible. One typical tag installation of the type described above and presently in use by many gas utility companies, is to be found and described in the patent issued to Markle No. 1,894,381, dated January 17, 1933.

To avoid the above outlined difficulties in this type of valve identification, I have devised a new and improved tag means utilizing a spring mount which is capable of holding the tag inside of the Buffalo box beneath the cover thereof in a manner to insure against the loss of the tag and to present the valve identification to the operator while precluding his operation of the valve without first visually observing the information on the tag prior to operating the valve.

The principal object of my invention is to disclose the features of a new and improved valve identification tag for use in conjunction with underground Buffalo box installations which insures the proper operation of the valve housed in the Buffalo box by presenting positive identification and the valve characteristics to the operator prior to his operation thereof.

Another object of my invention is to demonstrate the features of a new and improved means for mounting a valve identifying tag in an underground Buffalo box which insures against loss of the tag, is convenient for installation and permits ready removal of the tag and the mounting means for replacement as desired.

The above and further objects and features of my invention will appear to one skilled in the art from the following description thereof and with reference to the accompanying drawings.

In the drawings:

Figure 1 is a front elevational view in full cross-section showing a typical Buffalo box installation equipped with a valve tag embodying the concepts of my invention.

Figure 2 is an enlarged plan view of the upper end of the Buffalo box set forth in Figure 1 and demonstrating the mounting means associated with my valve tag;

Figure 3 is a cross-sectional view in side elevation taken along line 3—3 of Figure 2, looking in the direction of the arrows, and demonstrating the features of my valve tag and mounting means therefor in its associated relation with the Buffalo box.

Referring now to the drawings, it will be seen in Figure 1 that a Buffalo box indicated generally at 10 therein, is to be mounted in the ground and comprises a lower cylindrical housing 11 distinguished by lower bell shaped portion 12 into which a valve 13, fitted to a supply main or pipe 14, projects. A valve stem 15, associated with the valve member 13, projects upwardly and substantially coaxially with the axis of the cylindrical lower housing 11 and is provided with suitable polygonal exterior surfaces for the engagement therewith of the lower end of a conventional reach-rod or T-wrench (not illustrated). The upper end of the lower housing 11 is further distinguished by a plurality of external threads 16 over which is threadingly mounted a substantially cylindrical shaped upper sleeve member 17 having threading vertical adjustment with the lower housing 11 to regulate the Buffalo box to the desired height. The upper end of the sleeve member 17 is distinguished by a substantially cylindrical enlarged mouth portion 18 onto which is fitted a cover cap 19. Thread members 20 are formed internally of the sleeve portion 17 for engagement with the external threads 16 of the lower housing 11; such terminating adjacent the formation of the cylindrical portion 18 at the upper end of the adjustable sleeve member 17, all in a conventional manner.

Mounted transversely and internally of the sleeve portion 17 of the Buffalo box 10 is to be found my valve tag 30, which in its normal closed position, as illustrated in Figure 1, lies immediately below cap member 19 and substantially closes over the entrance into the lower housing 11 of the Buffalo box. As will be recognized from Figures 2 and 3 of the drawings in particular, tag 30 comprises a substantially circular plate member 31, preferably constructed of a non-corrosive plastic material, such as a phenolic resin or the like, to guard against corrosive deterioration thereof. A similar size transparent cover plate 32 is designed to overlie the circular plate member 31, as seen in Figure 3. Identification data for the valve housed within the Buffalo box 10 is to be mounted on the upper surface of plate 31 and protected from corrosion and deterioration by covering the same with the transparent cover plate 32 which is suitably sealed at its edges with the plate member 31; the cover plate 32 and plate 31 being of like plastic materials and capable of thermal fusion or a glued junction in a conventional manner. Plate member 31 is suitably supported on a pair of underlying arm members 33, 33 which may be separate elements thermally joined or otherwise fastened to the underside of the plate member 31 or such may, if desired, be formed integrally therewith by a plastic casting operation in a known manner. Arms 33 reach substantially across the underside of plate member 31 and are positioned in a parallel spaced relation to extend laterally outward from one edge thereof. A suitable reinforcing rib 34 reaches diametrically across the underside of plate 31, transversely of arms 33, and serves to rigidify the structure of my valve tag. Rib member 34 preferably is to be formed integrally with the arm members 33 and the plate member 31 when molding the plate member 31, although the rib 34 may comprise separate disjointed sections suitably glued or thermally fused to the plate member 31.

As will be seen from Figure 3 in particular, the two arm members 33 are distinguished at the left hand end, as viewed in that figure, by upwardly extending ear portions 35 through which pivotal apertures 36 are formed; aperture 36 being aligned and registering coaxially in the two ear members 35. The extreme left hand or outer end of the arms 33, as illustrated in Figure 3, are to be positioned adjacent side wall 37 of the Buffalo box's upper sleeve member 17 when my valve tag is mounted in its horizontal or closed position at the upper end thereof as illustrated in the drawing.

A U-shaped bracket member 38 of a strong wire or rod is provided for insertion through the registering apertures 36 formed in ear members 35, and such acts as a pivotal connection between the valve tag and the mounting springs 39, 39 in holding the same in the upper end of the Buffalo box sleeve 17. As will be seen from Figures 1 and 2 of the drawings, the two spring members 39 are of a coil type adapted to be connected to and extend flexibly outward from the opposite ends of bracket member 38 for mounting reception intermediate the thread teeth 20 formed on the internal surface of the Buffalo box upper sleeve 17. The spring members 39 are to be flexibly curved to conform to the internal cylindrical contour of the sleeve member 17 associated with the Buffalo box 10 and are positioned on the land portion of the threaded interior thereof intermediate the thread members 20. The tensioning of the springs 39 in bending and flexibly fitting them to the inside of the sleeve member 17 causes the ears 35 associated with arms 33 to be forced abuttingly against the side wall of the Buffalo box and resiliently held there to limit the downward arcuate movement of the tag to a substantially horizontal position as illustrated in Figure 1. To facilitate entry into the Buffalo box, whereby a reach rod or T-wrench may actuate the valve member 13 housed therein, my valve tag 30 may be swung arcuately upward through approximately 90° to a substantially vertical position as illustrated by the dotted lines of Figure 3. During this latter movement, the spring members 39 flex sufficiently to permit the ears 35 to disengage from the wall 37 for pivotal movement about their connection with the bracket member 38 where the springs 39 serve to hold the tag in its substantially vertical position. Preferably, spring members 39 are to be coated with a suitable anti-corrosive coating such as aluminum paint, a liquid plastic, or a preservative of a like nature whereby deterioration thereof from moisture or the like is discouraged.

It will be recognized that by mounting the tag 30 by means of the two spring elements 39, easy and quick removal of the tag from the Buffalo box is permitted by merely disengaging the springs from the interior side walls of sleeve member 17 and then pulling the tag member outwardly from the top portion thereof. Likewise insertion of the unit in the Buffalo box is simple and convenient with the springs being flexed inwardly and allowed to snap against the interior side wall of the Buffalo box for resilient engagement therewith. From the foregoing description it will be recognized that positive identification of the valve is insured by supplying the necessary identification and directions on the top of tag plate 31 as described.

Having thus described the features and functioning of my invention it readily will be appreciated that numerous changes, modifications and substitutions of equivalents may be made therein without departing from the spirit and scope of my invention. I, therefore, do not wish to be limited to the specific embodiment illustrated and described herein except as may appear in the following appended claim.

I claim:

An improved tag means to be removably secured transversely within the interior of a cylindrical member for obstructing passageway therethrough, comprising, a planar plate presenting an indicia supporting surface, spaced arm members depending from one side of said plate and extending inwardly from one edge thereof, pivotal rod means inserted transversely through said arm members adjacent the said one edge of said plate, said plate and arm members being pivotal as a unit about the axis of said rod means, and a pair of elongated coil springs, one extending coaxially outward from each end of said rod means and fixed at one end thereto, said springs being flexed arcuately toward said plate in a plane parallel thereto and beyond their point of connection with said rod means when mounting said tag means within said cylindrical member, the same gripping the interior side walls of said cylindrical member with outward radial thrust thereby to resiliently hold said tag means in position.

References Cited in the file of this patent

UNITED STATES PATENTS

| Number | Name | Date |
|---|---|---|
| 1,573,551 | Klausmeyer | Feb. 16, 1926 |
| 1,951,645 | Boosey | Mar. 20, 1934 |
| 2,186,749 | Blakeslee | Jan. 9, 1940 |
| 2,575,618 | Dillard | Nov. 20, 1951 |

FOREIGN PATENTS

| Number | Country | Date |
|---|---|---|
| 405,678 | Great Britain | Feb. 8, 1934 |